United States Patent

Ward

[15] 3,696,365
[45] Oct. 3, 1972

[54] CATHODIC PROTECTION SYSTEM
[72] Inventor: Charles F. Ward, Midland, Tex.
[73] Assignee: Mobil Oil Corporation
[22] Filed: July 30, 1971
[21] Appl. No.: 167,757

[52] U.S. Cl.............................340/253 E, 340/253 C
[51] Int. Cl...............................................G08b 5/14
[58] Field of Search......340/253 E, 253 C, 253 R, 248 R

[56] References Cited

UNITED STATES PATENTS 3,247,500  4/1966  Grazio....................340/248 B
3,266,027  8/1966  Nichols...................340/248 R Primary Examiner—Thomas B. Habecker
Attorney—William J. Scherback et al.

[57] ABSTRACT

This specification discloses a system for cathodically protecting a metallic body which is in contact with an electrolyte. This system employs in combination a rectifier, a coil and plunger forming a solenoid, a mechanical signaling device, a means mechanically connecting the plunger of the solenoid with the mechanical signaling device, a metallic body in contact with an electrolyte, a ground bed, and a means forming an electrical circuit including the rectifier, coil, metallic body, ground bed, and electrolyte. Loss of current due to rectifier failure permits the mechanical flag to appear as a warning.

10 Claims, 1 Drawing Figure

PATENTED OCT 3 1972
3,696,365
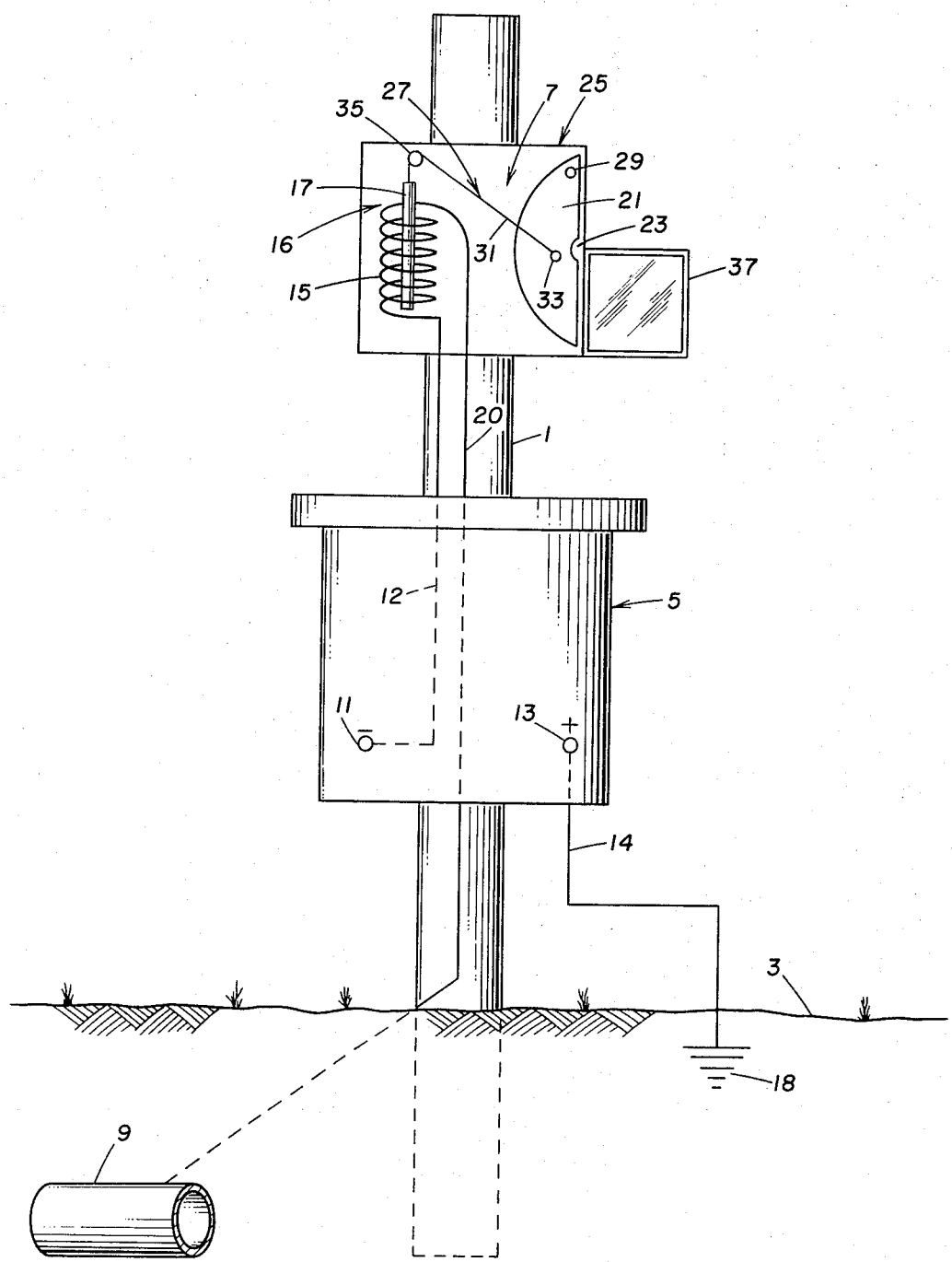
CHARLES F. WARD
INVENTOR
BY *Henry L. Ehrlich*
ATTORNEY

CATHODIC PROTECTION SYSTEM

BACKGROUND OF THE INVENTION

This invention relates to a system for cathodically protecting a metallic body.

When metallic bodies are placed in contact with an electrolyte, electrochemical action is set up resulting in electrochemical corrosion of the metallic body. This electrochemical action may be likened to a galvanic cell wherein current flows between an anode and a cathode that are electrically connected through an electrolyte and an external circuit. Atoms from an anionic portion of the metal making up the surface of the metallic body detach themselves from the surface and enter the electrolyte in the form of positively charged ions. These positively charged ions are formed by the attachment of positive charges that are available in the electrolyte to the atoms of the metal. This results in active corrosion and the evolution of oxygen at the anode. At the cathode there is no corrosion but there is an evolution of hydrogen.

A pipeline located in contact with the earth may result in the formation of a galvanic cell with the attendant electrochemical corrosion. A portion of the pipeline may become anodic and another portion cathodic. The external circuit is the pipe connecting these two sections and the electrolyte is the moist earth in which the pipe is in contact.

This electrochemical corrosion is often mitigated by cathodic protection. Electrons are supplied at the surface of the metallic body to neutralize all of the positive charges that come in contact with the metallic body. These negative charges at the surface of the metallic body may be supplied by connecting the negative terminal of a source of direct current to the metallic body while connecting the positive terminal to the earth, to thereby complete the circuit.

A common source of energy that is used for cathodic protection is commercially available alternating current which is converted into direct current by means of a rectifier. The rectifier usually includes a transformer section for stepping down the voltage of the purchased power to the lower voltage needed for cathodic protection and a rectifier section formed of selenium or silicon for converting the alternating current into direct current.

SUMMARY OF THE INVENTION

This invention concerns a cathodic protection system for protecting a metallic body in contact with an electrolyte. A rectifier converts alternating current into direct current. The positive direct current terminal is electrically connected to a ground bed in contact with the electrolyte and the negative direct current terminal is electrically connected to the metallic body thereby forming a closed electrical circuit for conducting direct current. A coil is electrically connected into the closed circuit whereby the direct current passes through the coil and generates a magnetomotive force that is proportional to the current. A plunger that is responsive to the magnetomotive force is positioned in relationship with the coil. This plunger is mechanically connected with a mechanical signaling device. Movement of this plunger activates the mechanical signaling device and gives a signal indicative of the current flow.

BRIEF DESCRIPTION OF THE DRAWING

The drawing is a schematic view of the system for cathodically protecting a metallic body located in an electrolyte.

DESCRIPTION OF THE PREFERRED EMBODIMENTS

This invention concerns a cathodic protection system and a method utilizing this system for cathodically protecting a metallic body. There is included a mechanical signaling device which enables the system to be remotely monitored, for example from a moving motor vehicle or airplane, to ensure that the system is working properly.

Referring to the drawing, there is illustrated a pole 1 extending from the earth 3 and supporting a rectifier 5 and a mechanical signaling device 7. A metallic pipeline 9 is located in the earth 3, which earth is capable of conducting electricity and acting as an electrolyte.

The rectifier 5 may be any suitable rectifier for converting alternating current into direct current for use in cathodically protecting a metallic body. Alternating current, for example, commercially available current, is connected (connections not shown) to rectifier 5. The rectifier 5 may include a transformer which steps down the voltage of the available alternating current to a lower voltage suitable for cathodically protecting a metal body. The rectifier 5 rectifies the alternating current into so-called "direct current." The negative direct current terminal 11 and positive direct current terminal 13 are shown.

A mechanical signaling device 7, which is suitable for giving a signal which may be visually seen from a remote location, is used in combination with the rectifier 5 for forming a remotely monitorable cathodic protection system. The basic components of the mechanical signaling device 7 are a coil 15 and plunger 17 associated together to form a solenoid 16; a plate or disk 21, preferably colored brightly such as fluorescent orange, pivotally mounted by pivot 23 to housing 25; an enclosed window 37 for viewing disk 21; and a means 27 for mechanically connecting plunger 17 to disk 21.

It may readily be seen that other structural configurations than a disk may be used with this invention. However, preferably a disk, and in particular a disk in the shape of a semicircle, is employed. Disk 21 is pivotally mounted by pivot 23 and enclosed in housing 25, the outside case of which is not shown. A counterbalance weight 29 is fixed to disk 21 above pivot 23 and near the upper edge of disk 21 to provide a gravity bias which tends to make disk 21 rotate about pivot 23 and into view in window 37. The window 37 which has transparent sides and is enclosed is attached to housing 25. A slot (not shown) is provided in housing 25 and window 37, allowing movement of disk 21 from housing 25 into window 37 where it may be remotely observed. The window 37 serves to keep foreign material and insects from entering housing 25 and interfering with the operability of mechanical signaling device 7. Further, window 37 is rendered frost-free by the heat developed by the electrical current which flows through coil 15, thereby allowing disk 21 to be seen in window 37 during cold weather.

A flexible cable 31, such as a nylon cord, is fixed to disk 21 at point 33 below and on the opposite side of pivot 23 from counterbalance weight 29. The flexible cable 31 leads upward from point 33 over a pulley 35 and is fixed to plunger 17, supporting it in relationship with coil 15. By this arrangement, the gravity bias of counterbalance weight 29 may be overcome by a strain being placed on flexible cable 31. Preferably, cable 31 is adjusted in length such that when a predetermined amount of current required to properly cathodically protect pipeline 9 is flowed through coil 15, a magnetomotive force is generated and positions plunger 17 such that disk 21 is positioned entirely within housing 25 as shown in the drawing. This adjustment of the length of cable 31 may be done by: (1) locating plunger 17 at the position it will assume under equilibrium when the predetermined amount of current required to properly cathodically protect pipeline 9 is flowed through coil 15; (2) rotating disk 21 to an "upright" position as shown in the drawing; and (3) attaching the flexible cable 31 to the disk 21 and plunger 17 and arm pulley 35 to maintain disk 21 in the upright position. A stop such as the wall of housing 25 may be employed to prevent disk 21 from rotating clockwise beyond the upright position. Pulley 35 may be located such that it also serves as a stop to limit the counterclockwise rotation of disk 21 to 90° from the upright position and thus to a horizontal position. Progressively lesser current flow through coil 15 reduces the magnetomotive force produced by coil 15 and allows disk 21 to rotate under the force of the gravity bias into window 37, thereby making progressively greater amounts of disk 21 visible. The no-current flow condition allows disk 21 to rotate counterclockwise 90° from the position shown to a horizontal position, thereby making visible one-half of disk 21 in window 37, indicating that the rectifier is inoperative.

For the arrangement whereby plunger 17 is located above its equilibrium position under the predetermined current flow to protect pipeline 9, as it is in the previously described arrangement where pulley 35 also serves as a stop, the magnetomotive force generated by the current flowing through coil 15 causes the plunger 17 to move downward with respect to coil 15 and to thereby rotate disk 21 clockwise. Similarly, lessening the current flow lessens the magnetomotive force and allows plunger 17 to be moved upward by force of the gravity bias.

In accordance with an embodiment of this invention, the negative direct current terminal 11 is electrically connected through conductors 12 and 20 to pipeline 9, thereby making pipeline 9 a cathode. The positive direct current terminal 13 is electrically connected through conductor 14 to a ground bed 18 thereby making ground bed 18 an anode and providing a closed circuit through which direct current may be conducted. Any suitable assemblage of terminals such as carbon or graphite rods, preferably located in low resistive soil, may be used as the ground bed 18. The coil 15 is electrically connected into the circuit such that the current that is used for cathodically protecting pipeline 9 flows through the coil 15 and produces a magnetomotive force that is proportional to the current flow.

Preferably, coil 15 is connected into the circuit intermediate negative terminal 11 and pipeline 9 such that the current flowing therebetween flows through coil 15. Thus, preferably one end of coil 15 is connected through conductor 12 to negative terminal 11 and the other end of coil 15 is connected through conductor 18 to pipeline 9.

I claim:

1. A cathodic protection system comprising, in combination:
   a rectifier for converting alternating current into direct current, said rectifier having negative and positive direct current terminals, said rectifier being adapted for connecting said negative terminal to a metallic body in contact with an electrolyte and for connecting said positive terminal to a ground bed in contact with said electrolyte thereby forming a closed electric circuit for conducting said direct current;
   a coil adapted for connecting into said circuit wherein said direct current is conducted through said coil thereby generating a magnetomotive force that is proportional to said direct current;
   a plunger formed of magnetic material positioned in relationship with said coil wherein said plunger is positioned by said magnetomotive force;
   a means for giving a mechanical signal; and
   means mechanically interconnecting said plunger and said signal means whereby said signal means moves conjointly with said plunger.

2. A cathodic protection system for protecting a metallic body in contact with an electrolyte comprising, in combination:
   a rectifier for converting alternating current into direct current, said rectifier having positive and negative direct current terminals;
   a ground bed in contact with said electrolyte;
   means for electrically connecting said ground bed with said positive terminal;
   means for electrically connecting said negative terminal with said metallic body thereby forming a closed electrical circuit for conducting said direct current;
   a solenoid coil electrically connected into said closed electrical circuit wherein said direct current is conducted through said coil to generate a magnetomotive force that is proportional to said direct current being conducted through said circuit;
   a plunger for said solenoid coil;
   a mechanical signaling device; and
   means mechanically connecting said plunger with said mechanical signaling device.

3. The system of claim 2 wherein said mechanical signaling device is comprised of, in combination:
   a disk mounted by a pivot on a support;
   means for biasing said disk to move about said pivot; and
   means mechanically connecting said disk to said plunger to control the movement of said disk by the movement of said plunger.

4. The system of claim 3 wherein said biasing means comprises a weight fixed to said disk to provide a gravity bias for moving said disk about said pivot.

5. The system of claim 3 further comprising, in combination, means for housing said mechanical signaling device.

6. The system of claim 5 further comprising, in combination, a window connected with said housing wherein said disk may extend from said housing into said window.

7. The system of claim 6 wherein said metallic body comprises a pipeline.

8. A signaling device for use in a cathodic protection system of the type having a source of direct current and an electrical circuit adapted to be connected with said source to conduct direct current through a metallic body in contact with an electrolyte, comprising the combination:
- a solenoid coil adapted to be electrically connected into said electrical circuit whereby said direct current is conducted through said coil to generate a magnetomotive force that is proportional to said direct current;
- a plunger for said solenoid coil;
- a disk mounted by a pivot;
- a means for biasing said disk to move about said pivot; and
- a means mechanically connecting said disk to said plunger for controlling the movement of said disk by the movement of said plunger.

9. The signaling device of claim 8 further comprising a housing enclosing said signaling device.

10. The housing of claim 9 further comprising a window connected with said housing wherein said disk may extend from said housing into said window.

* * * * *